W. T. DOREMUS.

Springs for Furniture, &c.

No. 133,971. Patented Dec. 17, 1872.

UNITED STATES PATENT OFFICE.

WILLIAM T. DOREMUS, OF NEW YORK, N. Y.

IMPROVEMENT IN SPRINGS FOR FURNITURE, &c.

Specification forming part of Letters Patent No. 133,971, dated December 17, 1872.

*To all whom it may concern:*

Figure 1:
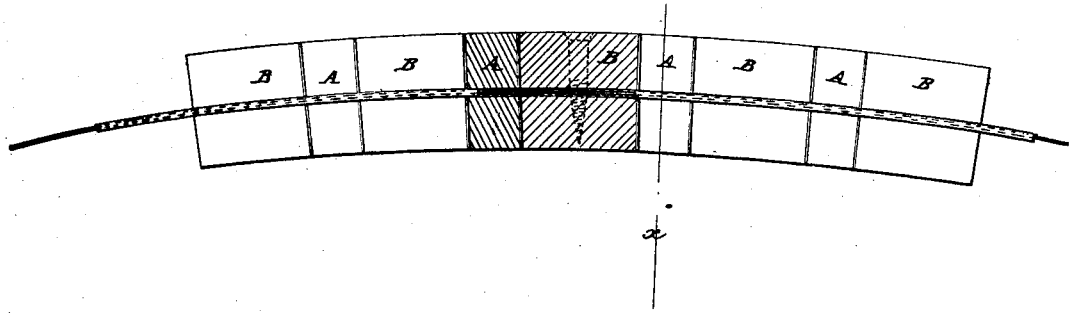
Figure 2:
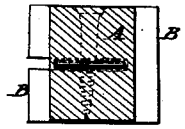

Be it known that I, WILLIAM T. DOREMUS, of the city, county, and State of New York, have invented a new and useful Improvement in Springs for Furniture, &c., of which the following is a specification:

Figure 1 is a side view of a spring illustrating my invention, part being broken away to show the construction. Fig. 2 is a detail cross-section of the same taken through the line $x$ $x$, Fig. 1.

Similar letters of reference indicate corresponding parts.

My invention has for its object to furnish an improved spring for furniture, such as chairs, sofas, lounges, mattresses, &c., for doors and vehicles, and for other purposes, which shall be simple in construction and effective in operation; and it consists in an improved spring formed by connecting rubber blocks and rigid blocks with each other alternately by means of flexible connections, as hereinafter more fully described.

A are the rubber blocks, which are interposed between blocks B, of wood, metal, or other substance. The rubber blocks A may be placed between the plane surfaces of the blocks B, or they may be placed in mortises or recesses formed in said blocks B. The blocks A and B may be made rectangular, wedge-shaped, round, or of other desired form, according to the use to which the spring is to be applied. The rubber blocks A and the rigid blocks B are connected by one or more wires, cords, or chains, or by hinges, lasting, straps of metal or leather, or flexible connection of other suitable material. The connections C are attached to or pass through the blocks B, and through or along the edge of the rubber blocks A.

The arrangement of the connectors C with the blocks A and B depends upon the use to which the spring is to be applied. One or more sets of the springs A B C may be arranged in connection with each other as the purposes for which the springs are intended may require. For instance, by placing two of the springs back to back a double spring will be produced suitable for a door swinging in both directions, each part of the spring acting in turn, and both bringing the door quickly and surely into a closed position.

In the drawing, the rubber and rigid blocks are represented as being connected by a metallic strap covered with lasting, which is passed through the rubber blocks A and inserted in slots in the rigid blocks B, where they are secured in place by screws. This construction forms a double spring equally elastic in either direction.

Having thus described my invention, I claim as new and desire to secure by Letters Patent—

An improved spring formed by connecting rubber blocks A and rigid blocks B with each other alternately by means of flexible connections C, substantially as herein shown and described, and for the purposes set forth.

WILLIAM T. DOREMUS.

Witnesses:
 JAMES T. GRAHAM,
 T. B. MOSHER.